July 4, 1961
M. SNOW
2,990,840
PRESSURE BALANCING VALVES
Filed Nov. 2, 1959
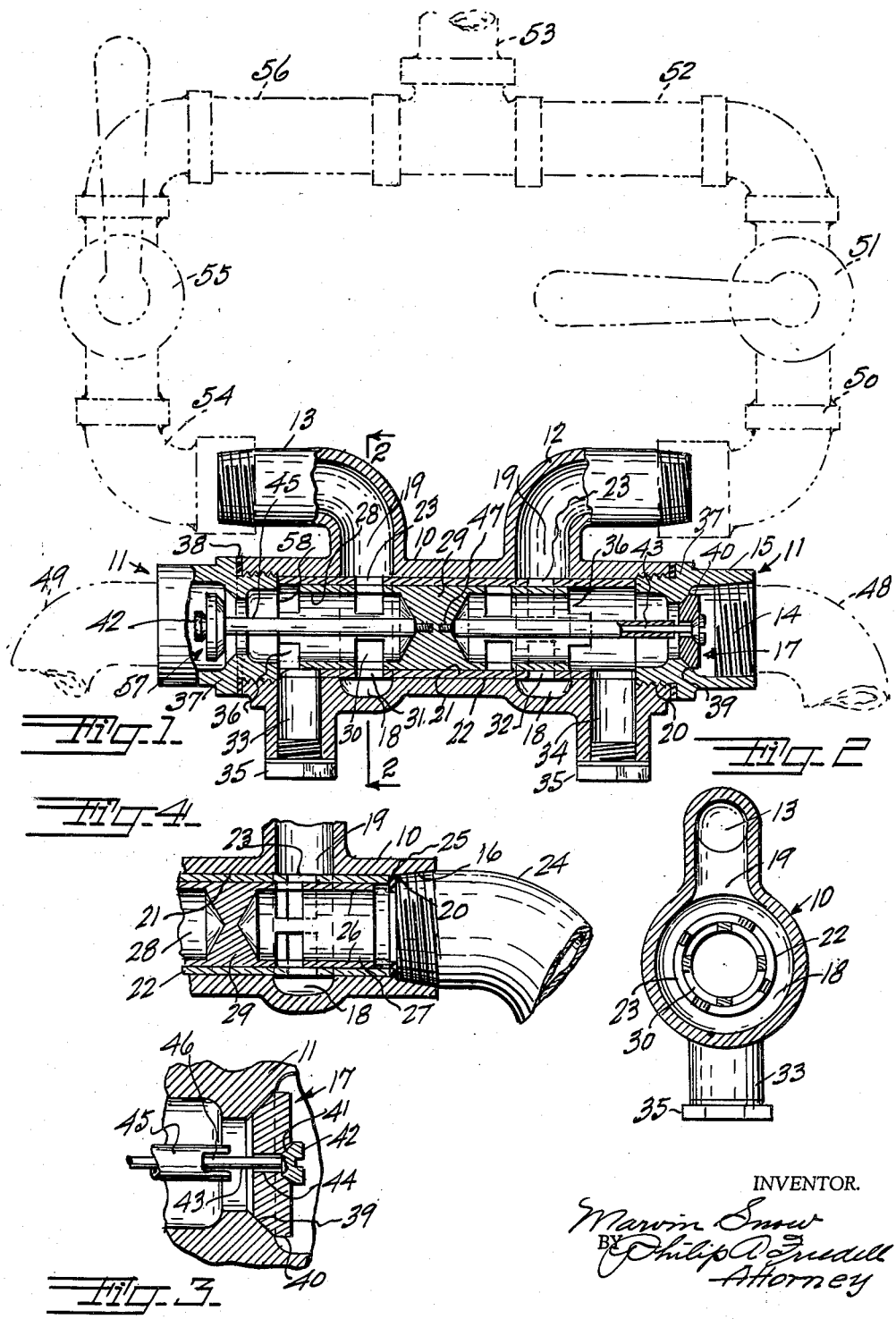
INVENTOR.
Marvin Snow
BY Philip A. Fradell
Attorney

United States Patent Office 2,990,840
Patented July 4, 1961

2,990,840
PRESSURE BALANCING VALVES
Marvin Snow, Oakland, Calif.
(1839 E. Bayshore Freeway, Redwood City, Calif.)
Filed Nov. 2, 1959, Ser. No. 850,268
4 Claims. (Cl. 137—99)

This invention relates to improvements in means for maintaining a constant temperature through the balancing of pressures between the hot and cold water sides of a wash water or shower system, compensating for variations in pressures between the hot and cold water lines as water is drawn off from either of the lines for other purposes at other locations, thus assuring the maintenance of both pressures and temperatures.

Under usual conditions, water for a shower or bath, or for intermediate temperatures for washing machines and the like, is adjusted to the desired temperature, and that temperature will hold unless water is drawn from a different point, such as for lawn sprinkling or dish washing, in which case there will be a drop in pressure on one side, resulting in a change of temperature of the hot-cold water mix, and the purpose of this invention is to automatically bring the pressures into balance, maintaining the proportionate feeds of hot and cold water to maintain the desired temperature.

The objects and advantages of the invention are as follows:

First, to provide means maintaining a relatively constant temperature of a hot-cold water mix through pressure balancing of the hot and cold water supplies.

Second, to provide means as outlined in the form of a pressure balancing valve to compensate for pressure differentials between the hot and cold water supplies.

Third, to provide a pressure-balancing valve of the simplest possible construction, economical to manufacture, easy to install, and responsive to slight differentials in pressures.

Fourth, to provide a pressure balancing valve with positive sealing means for sealing off one supply when water is drawn from the other of the supplies.

Fifth, to provide a pressure balancing valve with catch basins for foreign matter in the water.

In describing the invention reference will be had to the accompanying drawings, in which:

FIG. 1 is a longitudinal sectional elevation through the invention and showing conventional hot and cold water and mixing valve connections.

FIG. 2 is a section taken on line 2—2 of FIG. 1.

FIG. 3 is an enlarged sectional view of one of the sealing valves.

FIG. 4 is a fragmentary sectional elevation showing one end of the simplest form of the invention.

The invention consists of a housing 10 having an intake connection 11 at each end and spaced outlet connections 12 and 13 opening into the housing at intermediate points, the intake connections being suitably threaded as indicated at 14 and may obviously be either male or female connections formed in separate members 15, or directly in the ends of the housing as indicated at 16, depending on whether the sealing valves 17 are to be provided.

The simplest form of pressure balancing valve is provided with a housing having only the annular chambers 18 which communicate with the outlets 19, otherwise being only threaded at each end as indicated at 20 for the hot and cold water connections, and provided with a cylindrical bore 21 for the valve sleeve 22 which is provided with annular passages 23 opening into the annular chamber 18 and thence to the outlets 19 as shown, the sleeve being fixed against axial movement, and in its simplest form being secured by the intake connections 24 at the respective ends, a suitable washer 25 being interposed between the end of the sleeve and the inlet connection, and having an inside diameter substantially equal to the inside diameter of the piston wall 26 to function as a stop.

A free floating valve piston 27 operates slidably in the valve sleeve and has a passage 28 extending in each end. A partition 29 is located centrally of the length of the piston and the piston is provided with annular passages 30, the axial spacing of which is equal to the spacing of the annular passages in the valve sleeve minus the length of a passage, so that, in the intermediate position the passages in the piston half overlap the passages in the sleeve, and when one passage is fully open as indicated at 31, the other passages will be closed as indicated in an exaggerated position 32.

For protection against grit and other foreign matter, it is desirable to provide a chamber or catch basin adjacent each end of the housing as shown at 33 and 34, these catch basins being provided with removable closures such as the screw caps 35, the piston and valve sleeve being slotted in from each end as indicated at 36 for continuous communication with these catch basins, irrespective of the position of the piston.

The pressure balancing valve illustrated in FIG. 1 is provided with inlet sealing valves for sealing off one inlet when water is drawn only from the other inlet and these sealing valves include a valve chamber 37 for each end of the housing and threadedly connected thereto and having a connection 15 for the supply line and being suitably sealed to the housing as indicated by the gasket 38, the inner end of the valve chamber cooperating with the valve sleeve to secure it against movement and also functioning as a stop for limiting movement of the piston to open and closed positions for the annular passages in the sleeve.

This valve chamber 37 is provided with a valve seat 39 for the main valve 40 which has a relatively small axial valve seat for the breaking valve 42 which is provided with a valve stem 43 which is freely slidable in a passage 44 in the main valve 40, sufficiently free to permit passage of water to break any vacuum or release pressure. A sleeve 45 is slotted in its valve end as indicated at 46 for passage of water from the valve stem passage 44.

The valve stem 43 is fixed in the central partition as indicated at 47, and when screwed in tightly, the surrounding sleeve is slightly shorter than the distance between the central partition and the underside of the valve 42 so that initial movement of the piston will slightly open the breaking valve 42 to relieve the pressure on the main valve, followed by cooperation of the end of the sleeve or tube 45 with the valve 40 to open the valve for flow of water therethrough. The breaking valve is sufficiently small to insure opening under a minimum of differential pressures.

Considering line 48 as the cold water line, and 49 as the hot water line, FIG. 1 shows the cold water line connected through the pipe 50, valve 51, pipe 52 to the shower head pipe 53, while the hot water outlet 13 is connected through the pipe 54, valve 55, and pipe 56 to the shower head pipe 53, with the cold water valve 51 closed and the hot water valve 55 open.

The piston is thus subjected to maximum pressure from the line 48, forcing the piston to the left or toward the hot water intake and closing the sealing valve, since there is a considerable drop in pressure in the hot water line 49, and while fully opening the sealing valve 57, the piston has been moved against the stop 58 with the annular passages in the piston and sleeve on the hot water side of the partition in full registry as indicated at 31 for passage of hot water alone.

Should the valve 51 now be opened there would be an immediate drop in pressure in the outlet 12 with water in the hot water forcing the piston in the opposite direction to open the valve at the cold water inlet, the water in the cold water side of the cylinder being relieved by slight leakage between the piston and sleeve walls or edges of the annular passages, the piston being relatively free floating in this case, therefore the piston will move to open the breaking valve, resulting in travel of the piston to an intermediate point to restrict both passages to the outlets proportionate to the existing pressure differential.

With the mixing valve or valves 51 and 55 adjusted to the desired temperature of water delivered to the shower head pipe 53, drawing of water from a remote point of line 48 or 49 will result in a drop in pressure in that line resulting in increase of the openings to the outlet on that side with consequent decrease in the opening on the other side proportionately, thereby balancing the pressures and thus maintaining the predetermined temperature.

In the simplest form of the invention illustrated fragmentarily in FIG. 4, there are no sealing valves. However, the piston is a close sliding fit in the sleeve and therefore provides its own seal of suitable efficiency, and the piston is merely caused to move back and forth in conformity with the instant pressure differentials to control the flow of water through the respective outlet passages. As illustrated in FIG. 1, the spacing of the annular passages in the piston have been purposely exaggerated for purposes of clarity, since in an intermediate position the passages in the piston just half overlap the passages in the sleeve, and when one passage is fully closed, the other will be fully open.

Thus the simplest possible pressure balancing valve is provided, with a choice between double sealed or single sealed intakes.

I claim:

1. A pressure balancing valve comprising a housing having an intake connection at each end and spaced outlet connections intermediate the length thereof, a valve sleeve fixed in said housing and having a passage in communication with each outlet connection, and a piston having an axial passage formed in each end and terminating in a central partition and having a passage spaced in each direction from said central partition and selectively registrable with the passages in said sleeve and movable under pressure differentials to open and close the respective passages proportionately to the existing pressure differentials in the intake connections, said housing having a depending catch basin at each end for segregation of grit and foreign material, the ends of said piston being recessed for continuous communication with said catch basins.

2. A pressure balancing valve comprising a housing having an intake connection at each end and spaced outlet connections intermediate the length thereof, a valve sleeve fixed in said housing and having a passage in communication with each outlet connection, and a piston having an axial passage formed in each end and terminating in a central partition and having a passage spaced in each direction from said central partition and selectively registrable with the passages in said sleeve and movable under pressure differentials to open and close the respective passages proportionately to the existing pressure differentials in the intake connections, a sealing valve for each end of the housing and including each a valve seat with the sealing valve having connection with the piston at the respective ends for closing the sealing valve at one end when the pressure at that end is a maximum, and being opened under a pressure reduction from said maximum through axial movement of the piston.

3. A structure as defined in claim 2, said sealing valve including a main valve having an axial valve seat of lesser diameter than said main valve, and a valve for said axial valve seat and having a stem connected to said piston for operation therewith, and means on said stem for opening the main valve following initial lift of the valve from said axial valve seat.

4. A pressure balancing valve comprising a housing having an axial bore having an inlet at each end and having a pair of spaced outlets in communication with said bore intermediate the length thereof, a valve sleeve fixed in said bore and having spaced outlet passages in communication with said spaced outlets, and a piston having spaced passages selectively communicable between the respective spaced outlet passages and inlets and operated under differentials in pressures existent in the respective inlets and outlets for controlling passage of fluids to the outlets in conformity with the existent pressure differentials, a dependent catch basin at each end of said housing and in communication with said bore for deposit of grit and foreign matter, with the ends of the sleeve and piston recessed to provide continuous communication between the inlets and the catch basins.

References Cited in the file of this patent
UNITED STATES PATENTS

| | | |
|---|---|---|
| 806,271 | Manning et al. | Dec. 5, 1905 |
| 2,145,114 | Gibbs | Jan. 24, 1939 |
| 2,470,025 | Fraser | May 10, 1949 |
| 2,593,701 | Sanford | Apr. 22, 1952 |